(12) United States Patent
Hopfauf et al.

(10) Patent No.: US 10,955,058 B2
(45) Date of Patent: Mar. 23, 2021

(54) DIVERTER VALVE FOR A SANITARY FITTING WITH A BIASED SPINDLE, A CONCEALED INSTALLATION BODY WITH SUCH A DIVERTER VALVE AND A METHOD FOR MOUNTING A CONCEALED INSTALLATION BODY

(71) Applicant: Grohe AG, Hemer (DE)

(72) Inventors: Harry Hopfauf, Soest (DE); Heiko Langer, Kamen (DE); Frank-Thomas Luig, Menden (DE)

(73) Assignee: Grohe AG, Hemer (DE)

( * ) Notice: Subject to any disclaimer, the term of this patent is extended or adjusted under 35 U.S.C. 154(b) by 0 days.

(21) Appl. No.: 16/545,248

(22) Filed: Aug. 20, 2019

(65) Prior Publication Data

US 2020/0056710 A1    Feb. 20, 2020

(30) Foreign Application Priority Data

Aug. 20, 2018    (DE) ..................... 10 2018 120 204.0

(51) Int. Cl.
*F16K 11/044* (2006.01)
*F16K 11/078* (2006.01)
*F16K 27/04* (2006.01)

(52) U.S. Cl.
CPC ........ *F16K 11/0782* (2013.01); *F16K 27/041* (2013.01); *F16K 11/044* (2013.01); *F16K 11/0445* (2013.01)

(58) Field of Classification Search
None
See application file for complete search history.

(56) References Cited

U.S. PATENT DOCUMENTS

| | | | | |
|---|---|---|---|---|
| 5,083,589 A | * | 1/1992 | Wilcock | F16K 27/0263 137/625.29 |
| 5,730,184 A | | 3/1998 | Mönch | |
| 5,813,436 A | * | 9/1998 | Chen | F16K 11/0445 137/360 |
| 6,142,389 A | * | 11/2000 | Kynett | E03C 1/08 239/444 |
| 6,973,937 B1 | * | 12/2005 | Yang | E03C 1/023 137/119.05 |
| 2002/0005096 A1 | * | 1/2002 | Miyano | B23Q 7/06 82/127 |
| 2017/0157634 A1 | * | 6/2017 | Johnson | B05B 1/1645 |

FOREIGN PATENT DOCUMENTS

| | | |
|---|---|---|
| DE | 3208709 A1 | 9/1983 |
| DE | 3929586 A1 | 3/1991 |
| DE | 102004054612 A1 | 5/2006 |
| WO | WO9419633 A1 | 9/1994 |

* cited by examiner

*Primary Examiner* — John Fox
(74) *Attorney, Agent, or Firm* — Muncy, Geissler, Olds & Lowe, P.C.

(57) ABSTRACT

A diverter valve for a sanitary fitting having a diverter valve housing, a valve body for the targeted supply of a fluid to at least two diverter valve outlets, and a spindle for actuating the valve body. The spindle is biased, so that after cutting the spindle to length, the spindle is displaced from the diverter valve housing by a defined travel. Also a concealed installation body with a corresponding diverter valve as well as a method for mounting a corresponding concealed installation body are provided.

9 Claims, 10 Drawing Sheets

DIVERTER VALVE FOR A SANITARY FITTING WITH A BIASED SPINDLE, A CONCEALED INSTALLATION BODY WITH SUCH A DIVERTER VALVE AND A METHOD FOR MOUNTING A CONCEALED INSTALLATION BODY

This nonprovisional application claims priority under 35 U.S.C. § 119(a) to German Patent Application No. 10 2018 120 204.0, which was filed in Germany on Aug. 20, 2018, and which is herein incorporated by reference.

BACKGROUND OF THE INVENTION

Field of the Invention

The present invention relates to a diverter valve for a sanitary fitting, a concealed installation body for a sanitary fitting and a method for mounting a concealed installation body.

Description of the Background Art

Diverter valves serve to divert a flow of fluid between a plurality of fluid discharge points, such as overhead shower heads and hand-held shower heads of a shower and are often part of a concealed installation body. Concealed installation bodies can be mounted within a wall opening, in a cavity in a wall or another type of support. In particular, in built-in walls and pre-wall systems such concealed installation bodies have proven to be successful.

Concealed installation bodies serve to mount a functional unit in a stone wall, wall or another type of support. The functional unit may comprise a mixer, such as a thermostat cartridge, and/or a valve. By means of the mixer, a cold water and a hot water are miscible to a mixed water having a desired mixed water temperature, wherein a discharge amount of the mixed water is controllable by means of the mixer or the valve. At least one mixed water line can be connected to the concealed installation body, via which the mixed water, such as of a hand-held shower head, an overhead shower head, nozzle, spout and/or the like in a shower and/or bath can be fed to the sanitary fitting. The cold water connection is generally connected with a cold water house connection and the hot water connection is generally connected with a hot water house connection via appropriate piping.

Due to different mounting depths of the concealed installation body in the stone wall, wall or support, it is possible for control knobs, push buttons or rotary knobs, which operate the diverter valve of the concealed installation body, to protrude from the wall to different extents. As a result, a uniform appearance of the control knobs, push buttons or rotary knobs cannot be ensured once the concealed installation body has been mounted in the wall. In addition, with a non-exact installation of the concealed installation body, stop forces or bending moments can be induced by the control knobs, push buttons or rotary knobs on the diverter valve. This makes it possible for gaps to appear between the control knobs, push buttons or rotary knobs and a covering or decorative panel of the concealed installation body, which affects the appearance.

SUMMARY OF THE INVENTION

It is therefore an object of the invention is to at least partially solve the problems described with reference to the conventional art, and in particular to provide a diverter valve and a concealed installation body for a sanitary fitting with which a uniform outer appearance can be ensured. In addition, a method is to be specified for mounting a concealed installation body with which a uniform outer appearance can be ensured.

A diverter valve for a sanitary fitting in an exemplary embodiment can include a diverter valve housing; a valve body for the targeted supply of a fluid to at least two diverter valve outlets; and a spindle for actuating the valve body, wherein the spindle is biased, so that after cutting the spindle to length, the spindle is displaced from the diverter valve housing by a defined travel.

The diverter valve is used in, for example, sanitary fittings, which are used in connection with showers and/or bathtubs. The sanitary fittings may in particular be water inlets, hand-held shower heads, overhead shower heads, nozzles and/or the like. Such diverter valves are used in particular to divert a fluid flow between a plurality or multiplicity of fluid discharge points or sanitary fittings. The diverter valve may be, for example, a two-way diverter valve, by means of which a fluid can selectively be supplied to a first fluid discharge point or to a second fluid discharge point. For this purpose, the diverter valve has a diverter valve housing, which may be formed, for example, in the manner of a head piece. The diverter valve housing may also be designed such that it can be fastened to a concealed installation body or screwed into a concealed installation body. The diverter valve can be supplied with a fluid via a diverter valve inlet, which can be formed in the diverter valve housing. The diverter valve also has a valve body for the targeted supply of fluid to at least two diverter valve outlets. The valve body is, for example, displaceable in a diverter valve inlet chamber of the diverter valve between a first valve seat of a first diverter valve outlet and a second valve seat of a second diverter valve outlet, in particular by means of a translatory movement. When the valve body is moved against the first valve seat, the first diverter valve outlet is closed so that no fluid can flow through the first circulation valve outlet. The second circulation valve outlet is opened in this position of the valve body so that the fluid can flow through the second circulation valve outlet. If the valve body is moved against the second valve seat, the second diverter valve outlet is closed, so that no fluid can flow through the second circulation valve outlet. The first circulation valve outlet is opened in this position of the valve body, so that the fluid can flow off via the first circulation valve outlet. The first valve seat and/or the second valve seat may be formed on the diverter valve housing and/or on a component of a concealed installation body.

The valve body is mounted on a spindle and is actuated via the spindle. The spindle extends at least partially through the diverter valve housing and is guided by the diverter valve housing, in particular in parallel with its longitudinal axis. During operation of the diverter valve in the diverter valve housing, the spindle is displaceable to a limited extent, in particular by tension and/or pressure, for purposes of moving the valve body between the first valve seat and the second valve seat. Prior to assembly of the diverter valve, the spindle is biased so that after cutting the spindle, said spindle is displaced from the diverter valve housing by a defined travel. This means in particular that the spindle is acted upon by a force which presses the spindle in particular in a longitudinal direction, i.e., in parallel with the longitudinal axis of the spindle. The movement of the spindle is blocked or blocked before the spindle is cut to length. When cutting the spindle, the spindle is cut to a desired length, in particular depending on the mounting depth of the diverter valve. The cutting can be carried out with the help of a cutting template, which is mounted on the spindle and brought into a defined position relative to the wall. The cutting template can be pushed, for example, up to a support plate of the concealed installation body, which rests on the wall. By means of the cutting template, the spindle and optionally other components of the diverter valve can be cut to length in a sectional plane, which is at a predetermined distance from the wall. The cutting can be done by a fitter using a saw. By cutting the spindle to length, a movement of the spindle is automatically released. This is done by releasing, severing and/or cutting through a blocking element or locking element when cutting the spindle. In particular, the blocking element or locking element is formed such that when the spindle is cut, it is automatically released, severed and/or cut through along with the spindle. By releasing the spindle after cutting to length, the latter is displaced by its bias from the diverter valve housing by a defined travel. The travel corresponds in particular to the play that the valve body has between the first valve seat and the second valve seat. This results in that prior to mounting of further components on the spindle, such as a control knob, the spindle always protrudes by the same length from the wall, independent of the mounting depth of the diverter valve. In this way, a uniform outer appearance and accurate mounting of further components on the spindle can be ensured.

The spindle may be biased by an elastic element. The elastic element may be, for example, a spring, in particular in the manner of a coil spring or leaf spring. The elastic element contacts the spindle in particular at a longitudinal end of the spindle or a circumferential collar on the spindle. The elastic element may be supported on the diverter valve housing or on a component of the concealed installation body. Furthermore, the elastic element in particular generates an actuating force acting in a longitudinal direction, i.e., in parallel with the longitudinal axis of the spindle.

The valve body can be displaceable by the elastic element against a first valve seat. This may mean that the actuating force generated by the elastic element presses the spindle in the direction of the first valve seat.

The valve body may be displaceable against a second valve seat counter to an actuating force of the elastic element. This can be done, for example, by the user pressing on the spindle or a control knob of the spindle or by a fluid pressure in the diverter valve inlet chamber.

The spindle may be biased against a stop before cutting. The stop is a blocking element or locking element against which the spindle is pressed by the elastic element prior to cutting to length. In addition, the stop may be formed in the manner of a stopper plug.

The stop may be fastened to the diverter valve housing or to a guide sleeve of the spindle. The stop can be directly or indirectly fastened to the diverter valve housing or to the guide sleeve. The guide sleeve may be tubular and/or at least partially surround the spindle. In particular, the guide sleeve can be mounted concentrically on a spindle and/or on the diverter valve housing or be screwed into the diverter valve housing. The guide sleeve is used in particular to guide the spindle or a control knob of the spindle. Moreover, the guide sleeve may be cut to length in tandem with the spindle, in particular in the same cutting plane. The cutting of the spindle and the guide sleeve is thus carried out in particular in a single cutting step.

The stop may be removable by cutting the spindle to length. This means, as already mentioned, that when cutting the spindle, the stop is automatically also released, severed and/or cut through.

In accordance with another aspect, a concealed installation body for a sanitary fixture is also proposed, comprising for example: a housing; and a diverter valve according to the invention, which is at least partially disposed in the housing.

The concealed installation body is used in particular for sanitary fittings that are used in connection with showers and/or bathtubs. The sanitary fittings can in particular be water inlets, hand-held shower heads, overhead shower heads, nozzles and/or the like. Such concealed installation body are generally mounted within a wall opening, a cavity in a wall or another type of support and serve to accommodate a functional unit.

The concealed installation body may comprise a mixer, disposed at least partially in particular in a housing of the concealed installation body, and formed for example in the manner of a manual mixer or thermostat cartridge. The mixer can be a part of the functional unit. The housing may be at least partially made of plastic and/or metal. Furthermore, the housing can be at least partially tubular and may form at least one receiving space, for example for the functional unit. By means of the mixer, in particular a cold water and a hot water are miscible to a mixed water, having a desired mixed water temperature. The cold water can have a cold water temperature, which is in particular a maximum of 25° C. (Celsius), preferably 1° C. to 25° C., more preferably 5° C. to 20° C. The hot water may have a hot water temperature, which is in particular a maximum of 90° C., preferably 25° C. to 90° C., particularly preferably 55° C. to 65° C. By means of the mixer, e.g. with at least one mixed water line in the functional unit, the mixed water can be supplied to a diverter valve, by means of which the mixed water is supplied to a desired discharge point or sanitary fitting. For further details of the concealed installation body and the diverter valve, reference is made to the description of the diverter valve according to the invention.

In accordance with yet another aspect of the invention, also proposed is a method of mounting a concealed installation body according to the invention, comprising for example: fixing the concealed installation body at least partially in a wall or on a support; and cutting to length a spindle of a diverter valve of the concealed installation body.

By cutting the spindle to length, the spindle is automatically released, so that after cutting to length, the spindle is displaced from the diverter valve housing by a defined travel. The cutting of the spindle takes place at a desired distance from the wall or the support in order to ensure a uniform appearance. More details can be found in the description of the diverter valve according to the invention and the inventive concealed installation body.

For cutting the spindle to length, a cutting template can be mounted on the spindle. On an outer peripheral surface, the cutting template may have an in particular circumferential groove, which defines the cutting plane, for example, for a saw.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
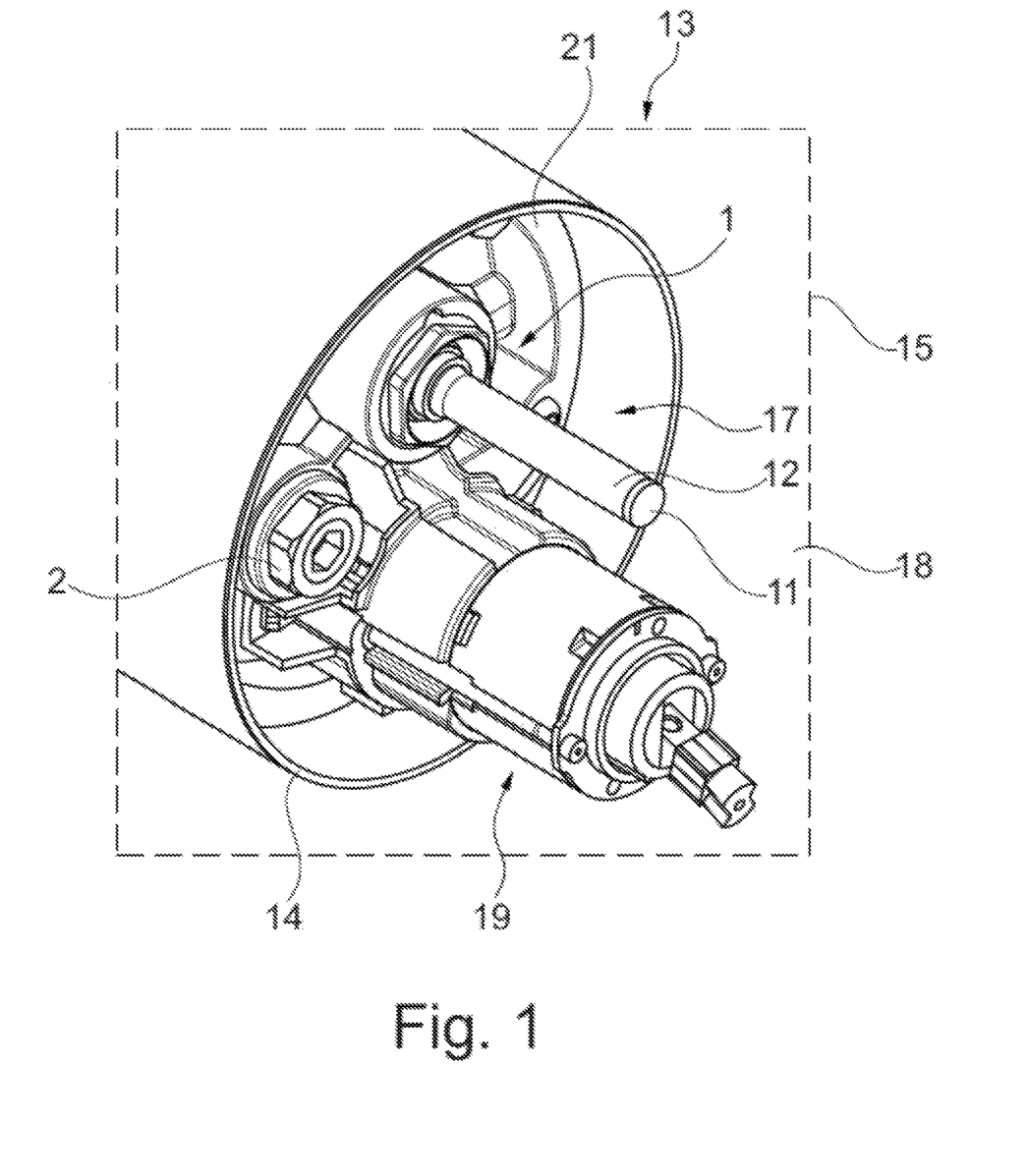
FIG. 1 shows an embodiment of a mounted concealed installation body in a perspective view.
Figure 2:
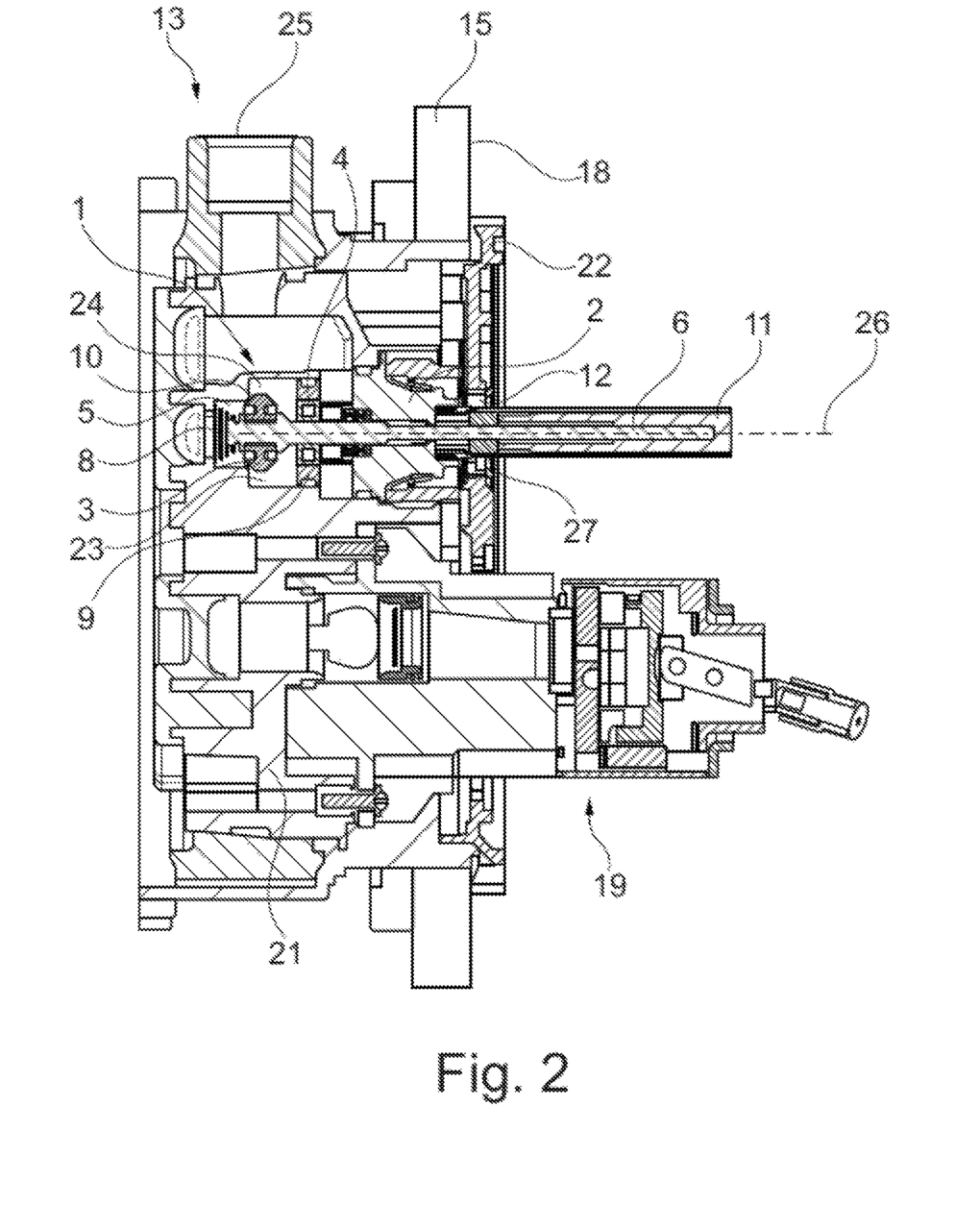
FIG. 2 shows the concealed installation body after mounting a support plate in a sectional view.

FIG. 1 shows an embodiment of a concealed installation body 13 in a perspective view during mounting in a wall 15. The concealed installation body 13 is first inserted in a mounting space 17 of the wall 15 and fixed therein. A portion of a housing 14 of the concealed installation body 13 possibly projecting beyond a front side 18 of the wall 15 is then cut off flush with the front side 18 of the wall 15. The concealed installation body 13 is substantially cylindrical in shape and has a mixer 19 designed as a manual mixer or a thermostat cartridge, and a diverter valve 1. The mixer 19 and the diverter valve 1 are connected to a functional unit 21 of the concealed installation body 13. The mixer 19 is fed cold water via a cold water inlet of the concealed installation body 13 and hot water via a hot water inlet of the concealed installation body 13. For this purpose, in the functional unit 21 of the concealed installation body 13, cold water lines are arranged from the cold water inlet to the mixer 19 and hot water lines from the hot water inlet to the mixer 19. The cold water and the hot water are miscible by means of the mixer 19 to a mixed water with a desired mixed water temperature. To actuate the mixer 19, the lever can be operated by a user via a lever 20 shown in FIG. 6. At least one mixed water line in the functional unit 21 runs from the mixer 19 to the diverter valve 1. The mixed water can be fed through the diverter valve 1 to either a first diverter valve outlet 4 or a second diverter valve outlet 5 (see. FIG. 2). Thus, the diverter valve 1 is formed in the manner of a two-way valve. Furthermore, a guide sleeve 12 and a stop 11 which is plugged into a longitudinal end of the guide sleeve 12 can be seen here. The guide sleeve 12 is attached to a diverter valve housing 2 of the diverter valve 1, which is designed here in the manner of an upper part. The diverter valve housing 2 in turn is screwed into the functional unit 21 of the concealed installation body 13.

FIG. 2 shows the concealed installation body 13 after mounting a support plate 22 in a sectional view. The support plate 22 sits flush with the front side 18 of the wall 15 on the wall 15 and is attached to the concealed installation body 13 and/or the wall 15. The mixed water flows from the mixer 19 via a mixed water channel of the functional unit 21 to a diverter valve inlet 23, which is designed here in the manner of a diverter valve inlet chamber 24, into the diverter valve 1. In the diverter valve inlet chamber 24, a valve body 3 is arranged which can optionally rest on a first valve seat 9 or a second valve seat 10. In FIG. 2, the valve body 3 rests on the second valve seat 10, so that a first diverter valve outlet 4 of the diverter valve 1 is open. The mixed water can thereby flow from the diverter valve inlet chamber 24 through the first diverter valve outlet 4 to a first outlet 25 of the concealed installation body 13. At the first outlet 25, a fluid line can be connected, which leads, for example, to a hand-held shower head of a shower. If the valve body 3 rests on the first valve seat 10, a second diverter valve outlet 5 of the diverter valve 1 is open. The mixed water can then flow from the diverter valve inlet chamber 24 through the second diverter valve outlet 5 to a second outlet of the concealed installation body 13. The valve body 3 is mounted on a spindle 6, so that the valve body 3 can be displaced by the spindle 6 between the first valve seat 9 and the second valve seat 10. For this purpose, the spindle 6 is mounted limitedly displaceable along its longitudinal axis 26, which here is congruent with a longitudinal axis of the diverter valve 1, in the diverter valve housing 2. The spindle 6 extends through an opening 27 of the support plate 22 out of the wall 15. Furthermore, the spindle 6 is surrounded by the guide sleeve 12 previously shown in FIG. 1. The guide sleeve 12 extends coaxially on a spindle 6 and is screwed into the diverter valve housing 2 with a first longitudinal end. At a second longitudinal end of the guide sleeve 12 situated opposite of the first longitudinal end of the guide sleeve 12, the stop 11 already shown in FIG. 1 is plugged in. The stop 11 is formed here in the manner of a stopper plug. The spindle 6 is biased against the stop 11 by an elastic element 8 in the manner of a spring. The elastic element 8 is arranged on a stop 11 opposite the longitudinal end of the spindle 6 and exerts a force on the spindle 6 in the direction of the stop 11. The stop 11 is attached to the guide sleeve 12 such that the stop 11 cannot unintentionally detach by the force of the elastic element 8. Here, the elastic element 8 is supported on the functional unit from 21 of the concealed installation body 13.

Figure 3:
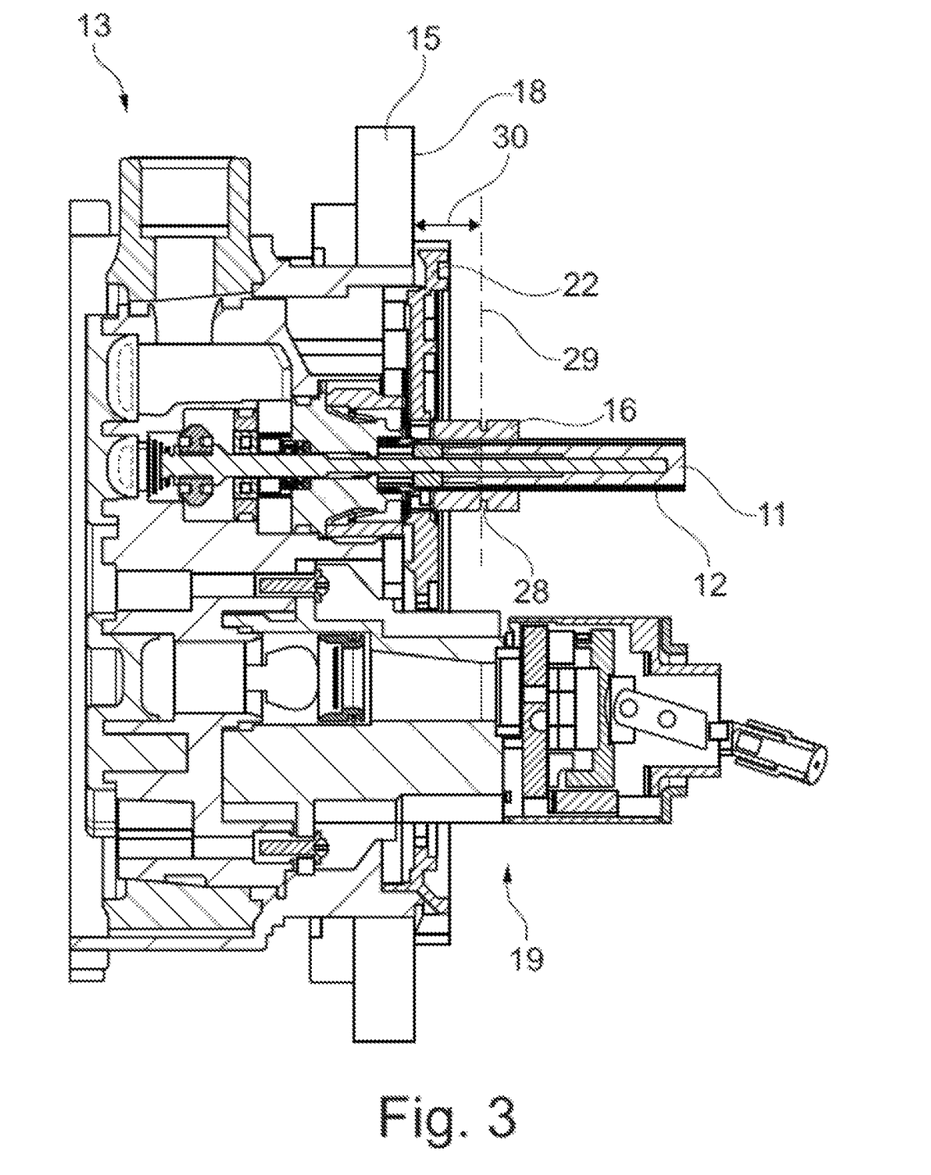
FIG. 3 shows the concealed installation body after mounting a cutting template in a sectional view.

FIG. 3 shows the concealed installation body 13 after attaching a cutting template 16, which is designed here like a saw template. The cutting template 16 is sleeve-shaped and pushed onto the guide sleeve 12 until it rests flush with the support plate 22. For this purpose, the cutting template 16 may have an inner diameter which corresponds substantially to an outer diameter of the guide sleeve 12. Furthermore, the cutting template 16 (detachable) can be locked to the support plate 22, so that the cutting template 16 in particular is non-rotatable relative to the support plate 22. The cutting template 16 has a circumferential groove 28 on an outer circumferential surface. The groove 28 serves as a guide for a saw, with which the spindle 6 and the guide sleeve 12 can be cut to length along a cutting plane 29 extending in parallel with the front side 18 of the wall 15. The cutting plane 29 is at a distance 30 to the front side 18 of the wall 15 which is predetermined by the cutting template 16. Regardless of the mounting depth of the concealed installation body 13 in the wall 15, by cutting along the cutting plane 29 that is predetermined by the cutting template 16, the spindle 6 and the guide sleeve 12 always project out of the wall 15 by a predetermined length.

Figure 4:
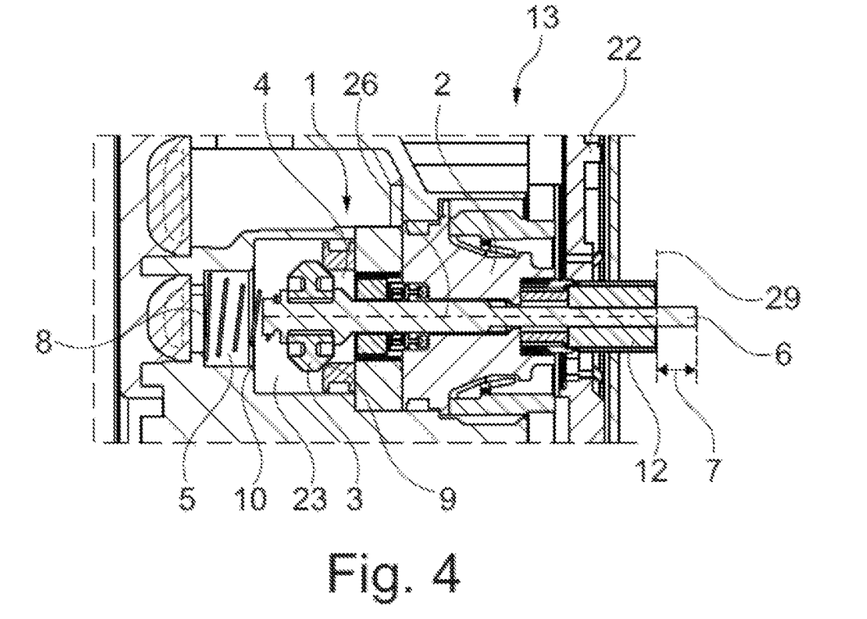
FIG. 4 shows a detailed view of the concealed installation body after cutting to length in a sectional view.

FIG. 4 shows a detailed view of the concealed installation body 13 with the support plate 22 in the region of the diverter valve 1 after cutting the spindle 6 and the guide sleeve 12 along the cutting plane 29. The guide sleeve 12 now projects by a length from the wall 15 shown in FIG. 3 which corresponds to the distance 30 shown in FIG. 3 between the front side 18 of the wall 15 and the cutting plane 29. By cutting the spindle 6 and the guide sleeve 12 to length, the stop 11 shown in FIG. 3 was removed, i.e., cut off. As a result, a movement of the spindle 6 is released along its longitudinal axis 26, so that the elastic element 8 moves the spindle 6 from the diverter valve housing 2 or the guide sleeve 12 by a travel 7. The spindle 6 thus pops out of the diverter valve housing 2. This way, the valve body 3 with the spindle 6 is moved from the second valve seat 10 to the first valve seat 9 by the elastic element 8. The travel 7 thus corresponds to a play of the valve body 3 between the first valve seat 9 and the second valve seat 10 of the diverter valve 1. The valve body 3 can be displaced by a user pushing the spindle 6 into the diverter valve housing 2 until the valve body 3 again rests on the second valve seat 10. In this position, the spindle 6 is flush with the guide sleeve 12 at the cutting plane 19. If the mixer 19 shown in FIG. 3 is open, the valve body 3 is held in this position by the fluid pressure in the diverter valve inlet 23 against the actuating force of the elastic element 8, so that the fluid drains off via the first diverter valve outlet 4, for example, to a hand-held shower head of a shower. If the mixer 19 is closed, the fluid pressure in the diverter valve inlet 23 drops so that the valve body 3 is pressed onto the first valve seat 9 by the elastic element 8 and the fluid can drain from the diverter valve inlet 23 via the second diverter valve outlet 5, for example, to an overhead shower head of the shower.

Figure 5:
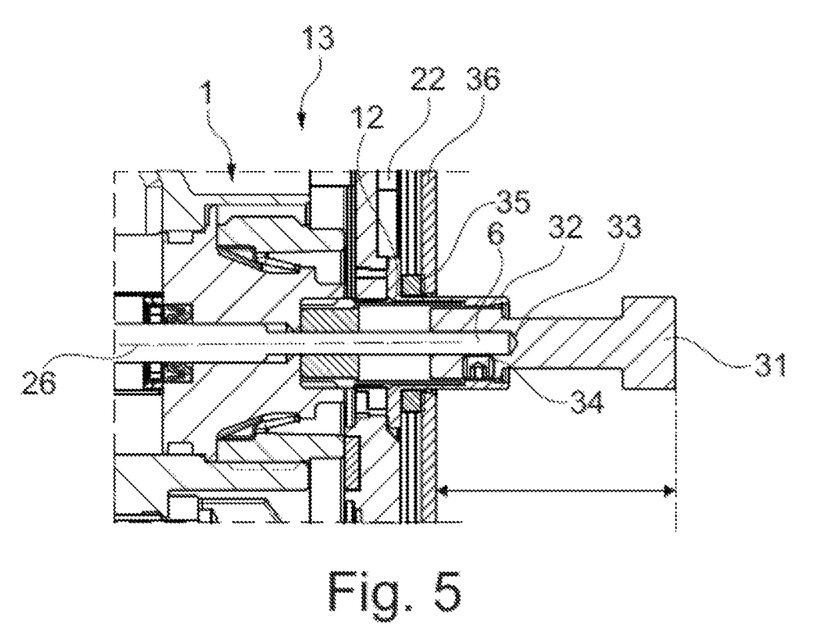
FIG. 5 shows the concealed installation body after mounting a control knob.

FIG. 5 shows a further detailed view of the concealed installation body 13 with the support plate 22 after mounting a control knob 31 for the diverter valve 1. The control knob 31 is mounted here on the spindle 6 in a first embodiment. After cutting the spindle 6 and the guide sleeve 12 shown in FIG. 4, first the control knob 31 is mounted by its receptacle 33 on a spindle 6 and fixed with a screw 34 on a spindle 6. The screw 34 is formed here in the manner of a grub screw. Subsequently, a decorative sleeve 32 is mounted on the guide sleeve 12, locked to the support plate 22 and sealed with a seal 35. The decorative sleeve 32 covers the screw 34 so that it is not visible regardless of the position of the control knob 31. Within the guide sleeve 12 and the decorative sleeve 32, the control knob 31 has an outer diameter which substantially corresponds to an inner diameter of the guide sleeve 12 and the decorative sleeve 32, so that the control knob 31 is guided in its movement along the longitudinal axis 26 by the guide sleeve 12 and the decorative sleeve 32. Finally, the concealed installation body 13 is covered with a decorative panel 36.

Figure 6:
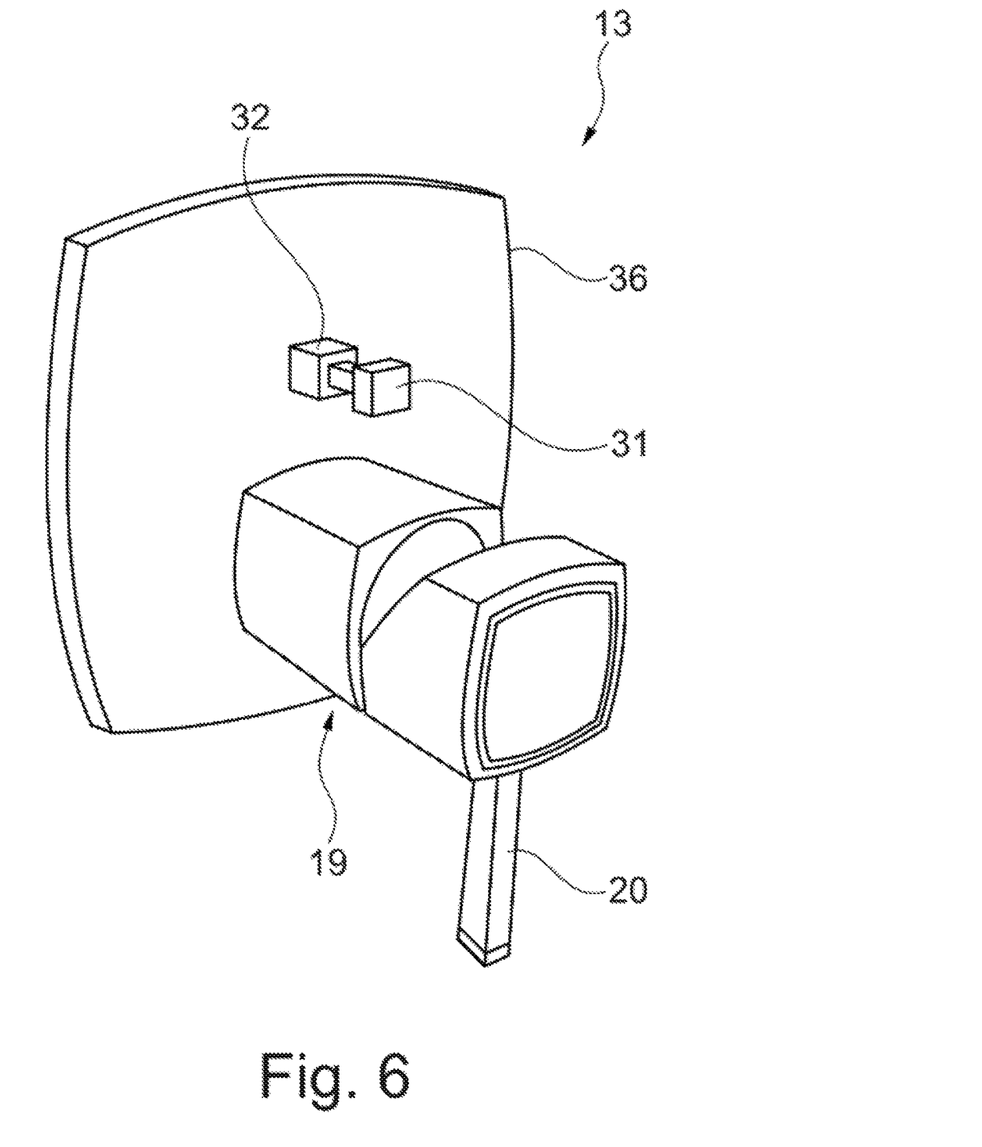
FIG. 6 shows the concealed installation body after complete installation.

FIG. 6 shows an outside view of the concealed installation body 13 after its complete assembly. Seen here are the control knob 31 guided in the decorative sleeve 32 and the lever 20 for actuating the mixer 19. The rest of the concealed installation body 13 is covered by the decorative panel 36.

Figure 7:
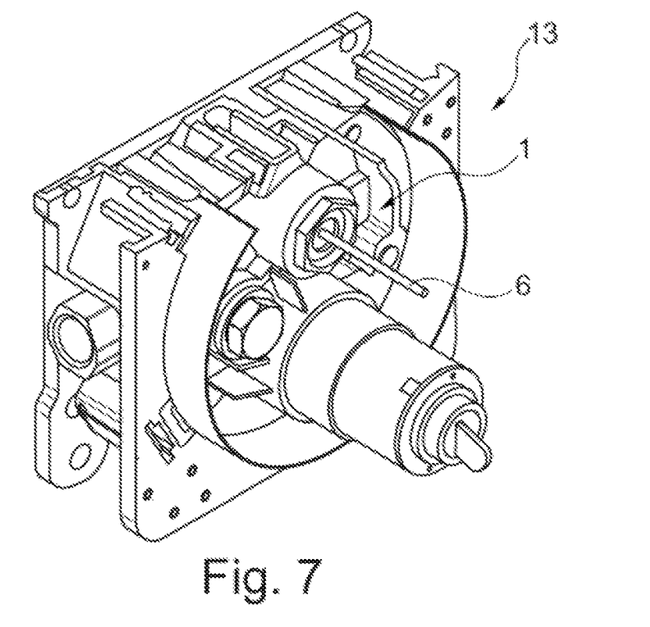
FIG. 7 shows an embodiment of the concealed installation body in a perspective view.

FIG. 7 shows a second embodiment of the concealed installation body 13 in a perspective view. The second embodiment of the concealed installation body 13 differs from the first embodiment of the concealed installation body 13 only by a different diverter valve 1. Here, the spindle 6 of the diverter valve 1 is not surrounded by a guide sleeve 12.

Figure 8:
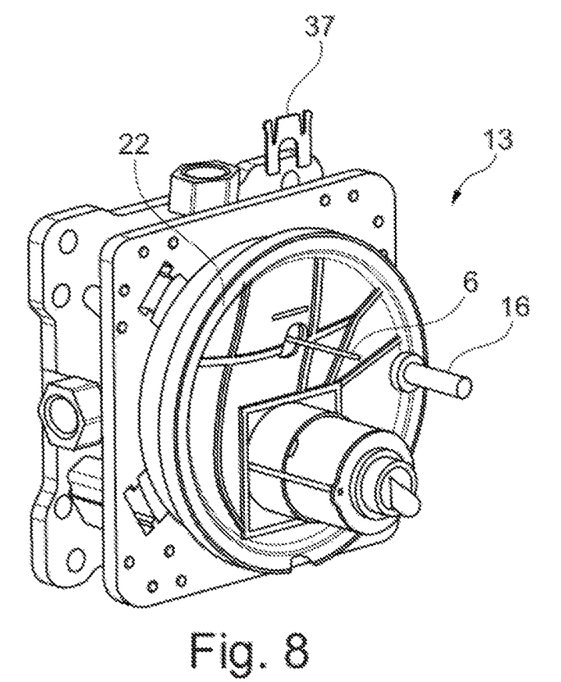
FIG. 8 shows the concealed installation body after mounting a support plate.

FIG. 8 shows the second embodiment of the concealed installation body 13 after attaching the support plate 22. For cutting the spindle 6, a cutting template 16 is placed directly on the spindle 6 and secured with a clip 37 to the support plate 22. Thereafter, the spindle 6 is deflected, for example, via a corresponding groove in the cutting template 16. In this case, the spindle can be manually pressed into the diverter valve housing 2 not visible here, so that after cutting to length the spindle 6 is displaced by a corresponding travel from the diverter valve housing 2.

Figure 9:
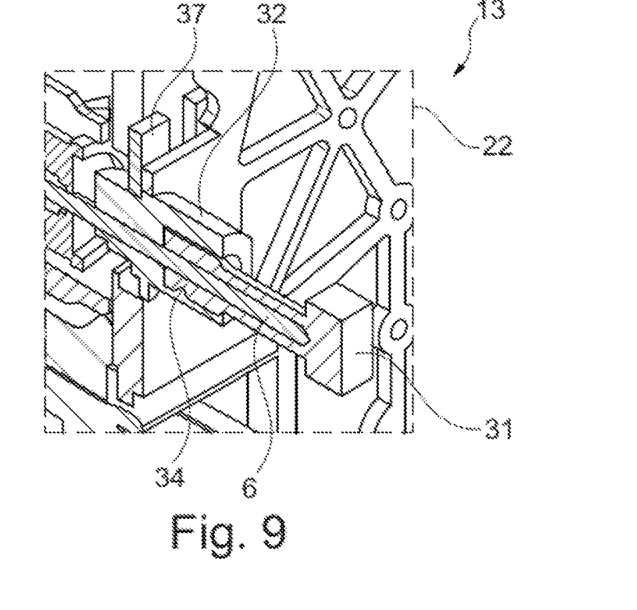
FIG. 9 shows a detailed view of the concealed installation body.

FIG. 9 shows the second embodiment of the concealed installation body 13 after cutting the spindle 6 to length. First, a decorative sleeve 32 is pushed onto a spindle 6 with the control knob 31 and the control knob 31 is mounted on a spindle 6 with the screw 34. Subsequently, the decorative sleeve 32 is secured to the support plate 22 with the clip 37.

Figure 10:
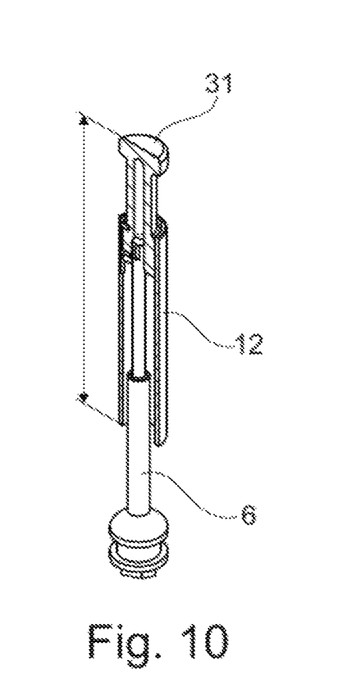
FIG. 10 shows the embodiment for mounting a control knob on a spindle.
Figure 11:
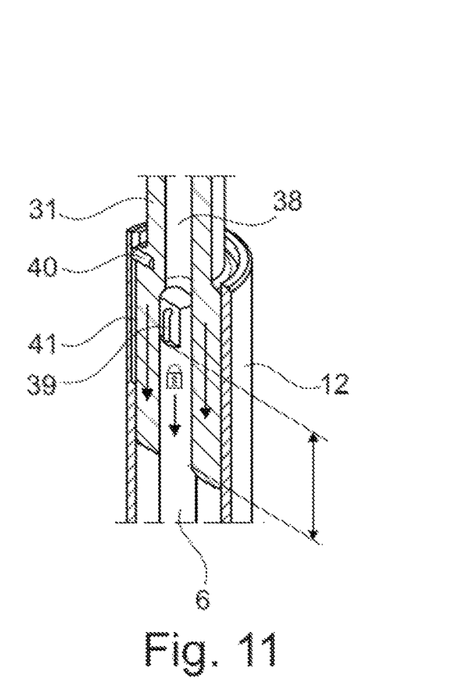
FIG. 11 shows a detailed view of the embodiment for mounting the control knob on a spindle.

FIG. 10 shows a second embodiment for mounting a control knob 31 on a spindle 6, which is at least partially surrounded by a guide sleeve 12. FIG. 11 shows a detailed view of the second embodiment for mounting the operation knob 31 on a spindle 6. The control knob 31 has an internal thread 38, with which the control knob 31 can be pushed onto a spindle 6 with a desired length to compensate for different mounting depths of a diverter valve. At one longitudinal end, the spindle 6 has a lateral barb 39 extending away from the longitudinal end, which engages with the internal thread 38 of the control knob 31 when the control knob 31 is pushed onto a spindle 6, so that the control knob 31 can no longer detach from the spindle 6. Furthermore, the control knob has a lateral pin 40, which engages in a longitudinal groove 41 of the guide sleeve so as to prevent rotation of the control knob 31.

Figure 12:
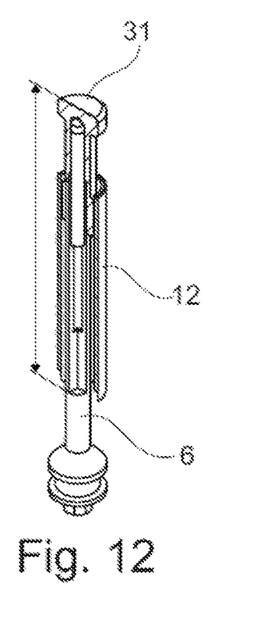
FIG. 12 shows an embodiment for mounting a control knob on a spindle.
Figure 13:
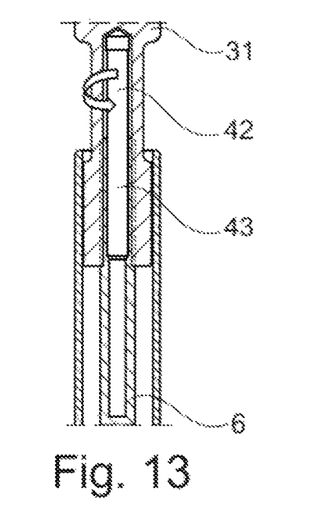
FIG. 13 shows a detailed view of the embodiment for mounting the control knob on a spindle.

FIG. 12 shows a third embodiment for mounting a control knob 31 on a spindle 6. Here, the spindle 6 is also surrounded by a guide sleeve 12. FIG. 13 shows a detailed view of the third embodiment for mounting the control knob 31 on the spindle 6. An adjusting screw 42 can be screwed into a longitudinal end of the spindle 6 to compensate for different mounting depths of a diverter valve 1, and, subsequently, the control knob 31 can be mounted onto the adjusting screw 42. For this purpose, the adjusting screw 42 has an external thread 43.

Figure 14:
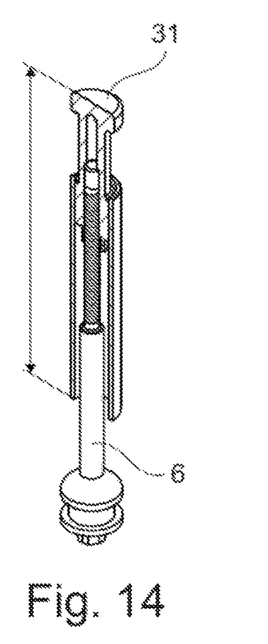
FIG. 14 shows an embodiment for mounting a control knob on a spindle.
Figure 15:
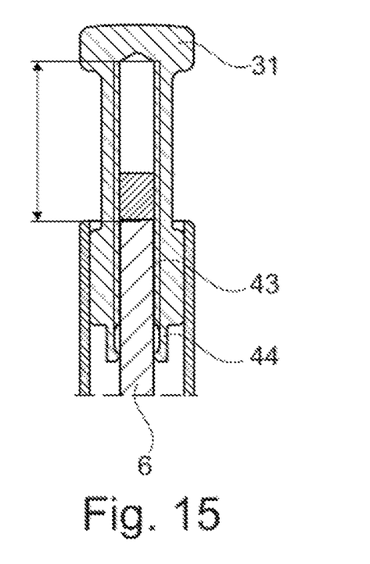
FIG. 15 shows a detailed view of the embodiment for mounting the control knob on a spindle.

FIG. 14 shows a fourth embodiment for mounting a control knob 31 on a spindle 6. FIG. 15 shows a detailed view of the fourth embodiment for mounting the control knob 31 on a spindle 6. The control knob 31 has latching hooks 44 at one longitudinal end by means of which the control knob 31 can be latched in a desired depth on an outer thread 43 of the spindle 6 to the spindle 6 to compensate for different mounting depths of the diverter valve 1.

Figures 16, 17:
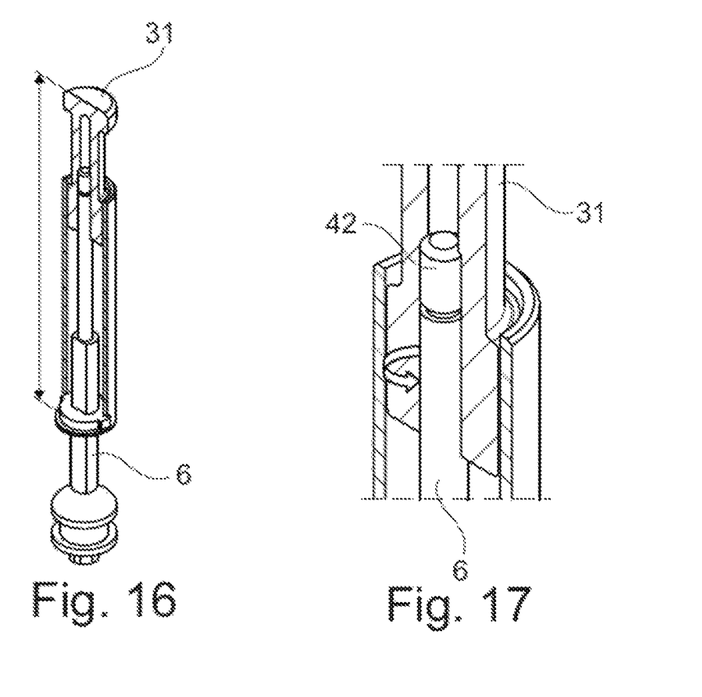
FIG. 16 shows an embodiment for mounting a control knob on a spindle.
FIG. 17 shows a detailed view of the embodiment for mounting the control knob on a spindle.

FIG. 16 shows a fifth embodiment for mounting a control knob 31 on a spindle 6. FIG. 17 shows a detailed view of the fifth embodiment for mounting the control knob 31 on a spindle 6. In a longitudinal end of the spindle 6, an adjusting screw 42 can be screwed on a spindle 6 at a desired height to compensate for different mounting depths of the diverter valve 1. Subsequently, the control knob 31 is mounted on the adjusting screw 42 and the spindle 6.

Figure 18:
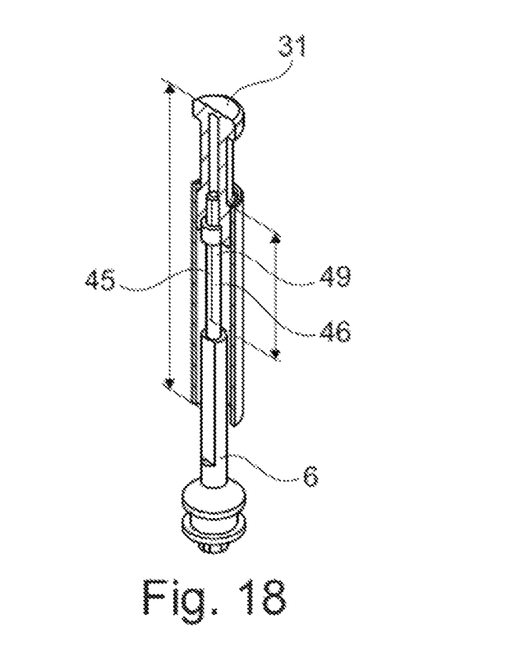
FIG. 18 shows an embodiment for mounting a control knob on a spindle.
Figure 19:
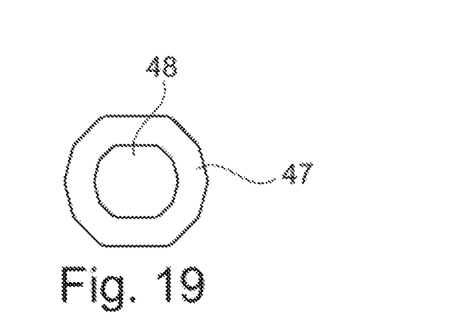
FIG. 19 shows a first insert of an embodiment for mounting the control knob on a spindle in a first illustration.
Figure 20:
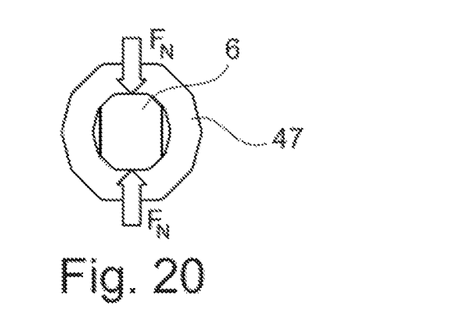
FIG. 20 shows the first insert of the embodiment for mounting the control knob on a spindle in a second illustration.

FIG. 18 shows a sixth embodiment for mounting a control knob 31 on a spindle 6. The spindle 6 has a cross section 46 at one longitudinal end, which is not round. In the embodiment shown here, in this area the spindle 6 has two opposing flattened portions 45. FIG. 19 shows a plan view of a first insert 47. The insert 47 is sleeve-shaped and has an inner contour 48, which (substantially) corresponds to an outer contour 49 of the spindle 6 shown in FIG. 18. In this way, the insert 47 can be mounted on the longitudinal end of the spindle 6 to compensate for different mounting depths of the valve body 1. At a desired height, the insert 47 is rotated by 90° for mounting on a spindle 6, so that the insert 47, as shown in FIG. 20, is elastically deformed. The insert 47 is then fixed non-positively on a spindle 6.

Figure 21:
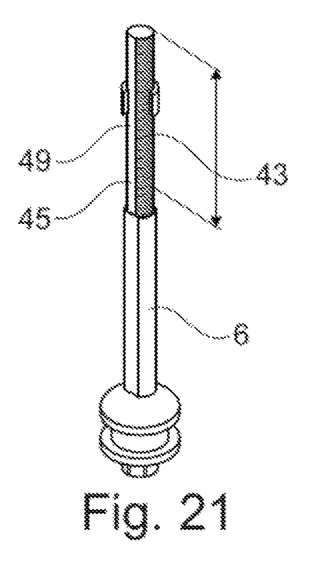
FIG. 21 shows an embodiment for mounting a control knob on a spindle.
Figure 22:
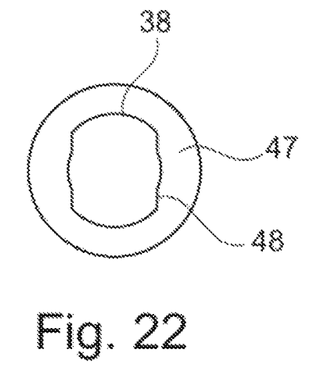
FIG. 22 shows a second insert of an embodiment for mounting the control knob on a spindle.

FIG. 21 shows a seventh embodiment for mounting a control knob 31 on a spindle 6. The spindle 6 has an external thread 43. In the region of the external thread 43, the spindle 6 has two opposite flattened portions 45 on which no external thread 43 is formed. FIG. 22 shows a plan view of a second insert 47. The insert 47 is likewise of sleeve-shaped design and has an inner contour 48 which (substantially) corresponds to an outer contour 49 of the spindle 6 shown in FIG. 21. In addition, the insert 47 has an internal thread 38. The insert 47 can be mounted on the longitudinal end of the spindle 6 and is rotatable by 90° at a desired position to compensate for different mounting depths of the diverter valve 1, so that the internal thread 38 of the insert engages in the external thread 43 of the spindle 6.

Figure 23:
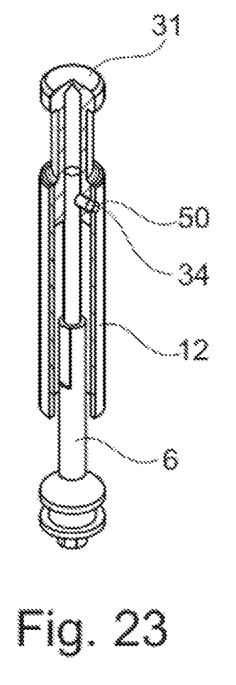
FIG. 23 shows an embodiment for mounting a control knob on a spindle.

FIG. 23 shows an eighth embodiment for mounting a control knob 31 on a spindle 6. The control knob 31 can be mounted on a longitudinal end of the spindle 6 at a desired height to compensate for different mounting depths of the diverter valves 1 and can be secured on a spindle 6 with a screw 34. For this purpose, a hole 50 can be formed in a guide sleeve 12 for the screw 34.

Figure 24:
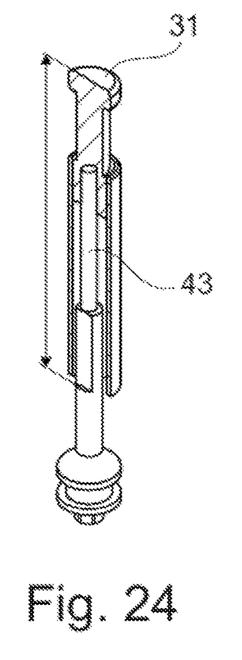
FIG. 24 shows an embodiment for mounting a control knob on a spindle.

FIG. 24 shows a ninth embodiment for mounting a control knob 31 on a spindle 6. The spindle 6 has an external thread 43 onto which the control knob 31 can be screwed at a desired height to compensate for different mounting depths of a diverter valve 1.

The proposed diverter valve and the concealed installation body ensure the uniform appearance of a sanitary fitting.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A diverter valve for a sanitary fitting, the diverter valve comprising:
    a diverter valve housing;
    a valve body for a targeted supply of a fluid to at least two diverter valve outlets; and
    a spindle to actuate the valve body, wherein said spindle is biased such that after cutting the spindle to length, the spindle is displaced from the diverter valve housing by a defined travel,
    wherein the spindle is biased against a stop prior to being cut to length.

2. The diverter valve according to claim 1, wherein the spindle is biased by an elastic element.

3. The diverter valve according to claim 2, wherein the valve body is displaced against a first valve seat by the elastic element.

4. The diverter valve according to claim 3, wherein the valve body is displaced counter an actuating force of the elastic element against a second valve seat.

5. The diverter valve according to claim 1, wherein the stop is fixed to the diverter valve housing or to a guide sleeve of the spindle.

6. The diverter valve according to claim 1, wherein the stop is adapted to be removed by cutting the spindle to length.

7. A concealed installation body for a sanitary fitting, comprising:
    a housing; and
    a diverter valve according to claim 1, the diverter valve being at least partially disposed in the housing.

8. A method for mounting a concealed installation body according to claim 7, the method comprising:
    mounting the concealed installation body at least partially in a wall or a support; and
    cutting to length a spindle of a diverter valve of the concealed installation body.

9. The method according to claim 8, wherein, for cutting the spindle, a cutting template is mounted on the spindle.

* * * * *